United States Patent
Ogawa et al.

(10) Patent No.: US 12,027,046 B2
(45) Date of Patent: Jul. 2, 2024

(54) TRAFFIC SIGNAL SYSTEM AND TRAFFIC SIGNAL DEPLOYMENT METHOD

(71) Applicant: TOYOTA JIDOSHA KABUSHIKI KAISHA, Toyota (JP)

(72) Inventors: Noriko Ogawa, Miyoshi (JP); Hiroshi Kimpara, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 87 days.

(21) Appl. No.: 18/080,037

(22) Filed: Dec. 13, 2022

(65) Prior Publication Data

US 2023/0252894 A1 Aug. 10, 2023

(30) Foreign Application Priority Data

Feb. 10, 2022 (JP) ................................. 2022-019493

(51) Int. Cl.
  *G08G 1/095* (2006.01)
  *B64C 39/02* (2023.01)
  *G08G 1/0955* (2006.01)

(52) U.S. Cl.
  CPC .......... *G08G 1/0955* (2013.01); *B64C 39/024* (2013.01)

(58) Field of Classification Search
  CPC .. G08G 1/0955; G08G 5/0013; G08G 5/0043; B64C 39/024; B64U 50/19; B64U 2101/00; B64U 2101/30; B64U 2101/60; B64U 2201/00; B64U 2201/20; B64U 10/13; B64U 10/30; B64U 50/34; B64U 2201/102
  See application file for complete search history.

(56) References Cited

U.S. PATENT DOCUMENTS

| | | | |
|---|---|---|---|
| 9,087,451 B1 * | 7/2015 | Jarrell | ................. G08G 5/0043 |
| 2022/0024483 A1 * | 1/2022 | Choi | ...................... G08G 1/162 |
| 2024/0111305 A1 * | 4/2024 | Bradley | ............... G06Q 50/265 |

FOREIGN PATENT DOCUMENTS

| | | |
|---|---|---|
| JP | 2020-029249 A | 2/2020 |
| WO | 2018/230539 A1 | 12/2018 |

\* cited by examiner

*Primary Examiner* — Toan N Pham
(74) *Attorney, Agent, or Firm* — Oliff PLC

(57) ABSTRACT

A traffic signal system and a traffic signal deployment method that enable a traffic signal to be disposed quickly are provided. A traffic signal system includes multiple drones each of which can hold a traffic signal, and a server that can communicate with the multiple drones, in which the server includes a position information acquisition unit that acquires position information of a target point, the target point being a place where it is necessary to dispose the traffic signal, and the drone includes: a flight control unit that controls flight of the drone holding the traffic signal so that it moves to the target point and hovers at the target point based on the position information; and a light control unit that controls lighting of the traffic signal so that timings of the lighting of the multiple traffic signals are synchronized with each other.

7 Claims, 8 Drawing Sheets

TRAFFIC SIGNAL SYSTEM AND TRAFFIC SIGNAL DEPLOYMENT METHOD

CROSS REFERENCE TO RELATED APPLICATIONS

This application is based upon and claims the benefit of priority from Japanese patent application No. 2022-019493, filed Feb. 10, 2022, the disclosure of which is incorporated herein in its entirety by reference.

BACKGROUND

The present disclosure relates to a traffic signal system and a traffic signal deployment method.

When a power failure has occurred due to a disaster or other reasons, a risk a traffic signal system may fail to function and hence traffic congestion or an accident occurs increases. Therefore, to solve this problem, the installation of a traffic signal including a battery mounted therein or a traffic signal using natural energy such as sunlight has been discussed. However, in a case in which the support pillar of a traffic signal tilts or collapses due to an earthquake or other reasons, the traffic signal is not able to function as a traffic signal even when it includes a battery in advance. Further, in this case, it is not possible to quickly perform the restoration of the traffic signal, since it takes a lot of time to perform the steps for restoring it, such as setting up the support pillar again.

Japanese Unexamined Patent Application Publication No. 2020-029249 discloses that when a swimmer is in danger of drowning at a beach, a drone holding a life preserver deployed at a lookout tower or other location will be made to deliver the life preserver to the swimmer to be rescued.

SUMMARY

However, in Japanese Unexamined Patent Application Publication No. 2020-029249, a case in which the traffic signal can no longer be used due to a disaster or other reasons is not taken into account, and it is not possible to respond quickly to the stopping of the traffic signal.

The present disclosure has been made in order to solve the above-described problem, and an object thereof is to provide a traffic signal system and a traffic signal deployment method that enable a traffic signal to be disposed quickly.

A first exemplary aspect is a traffic signal system including multiple drones each configured to be able to hold a traffic signal, and a server configured to be able to communicate with the multiple drones, wherein the server includes a position information acquisition unit configured to acquire position information of a target point, the target point being a place where it is necessary to dispose the traffic signal, and the drone includes: a flight control unit configured to control flight of the drone holding the traffic signal so that it moves to the target point and hovers at the target point based on the position information; and a light control unit configured to control lighting of the traffic signal so that timings of the lighting of the multiple traffic signals respectively held by the multiple drones hovering at the target point are synchronized with each other.

A second exemplary aspect is a traffic signal deployment method, wherein: a server acquires position information of a target point, the target point being a place where it is necessary to dispose a traffic signal; a drone holding the traffic signal moves to the target point and hovers at the target point based on the position information; and the drone holding the traffic signal controls lighting of the traffic signal so that timings of the lighting of the multiple traffic signals respectively held by the multiple drones hovering at the target point are synchronized with each other.

By use of the traffic signal system according to the first exemplary aspect of the present disclosure or the traffic signal deployment method according to the second exemplary aspect of the present disclosure, it is possible to move, by multiple drones, multiple traffic signals to a target point, which is a place where it is necessary to dispose the traffic signals, and dispose them in the target point, and to control timings of the lighting of the multiple traffic signals disposed. Therefore, it is possible to provide the traffic signal system and the traffic signal deployment method that enable the traffic signal to be disposed quickly.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

First Embodiment

A first embodiment will be described hereinafter with reference to the drawings. However, the present disclosure is not limited to the following first embodiment. Further, for the clarification of the description, the following descriptions and the drawings are simplified as appropriate.

Figure 1:
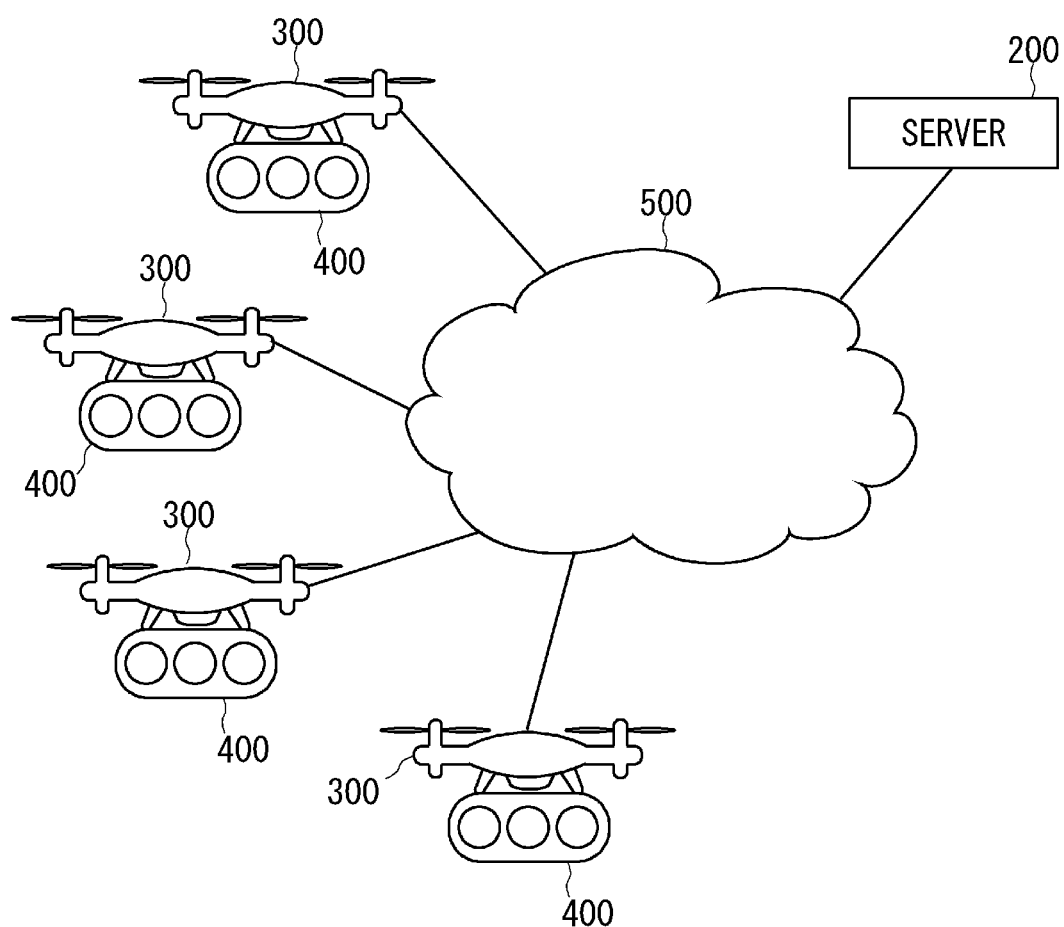
FIG. 1 is a diagram showing an example of a configuration of a traffic signal system according to a first embodiment of the present disclosure.

FIG. 1 is a diagram showing an example of a configuration of a traffic signal system 100 according to the first embodiment. As shown in FIG. 1, the traffic signal system 100 includes a server 200 and drones 300. The server 200 can communicate with multiple drones 300, . . . , that is two or more drones 300, . . . , via the Internet 500. Further, the multiple drones 300 can communicate with each other via short-range radio communication or the like.

The multiple drones 300 are deployed at predetermined drone bases. Further, they have been charged and are standing by at the drone bases. Note that one large drone base may be located in each prefecture or each city, or small drone bases may be located in each prefecture or each city in a distributed manner. For example, a drone base may be located on the roof of a school or a relatively tall building.

Further, one server 200 may be provided for each drone base, or one server 200 may be provided for multiple drone bases.

Each of the multiple drones 300 detachably holds one of traffic signals 400. Further, each of the multiple drones 300 may have the traffic signal 400 in built-in manner so that it can be taken in and out. Further, each of the multiple drones 300 may fixedly hold one of the traffic signals 400.

Further, the traffic signal 400 may be formed by, for example, an organic electro-luminescence (EL) sheet. The traffic signal 400 is formed by an organic EL sheet, whereby the traffic signal 400 is light and thin. As a result, the traffic signal 400 can be easily held by the drone 300 and the power consumption can be reduced.

Figure 2:
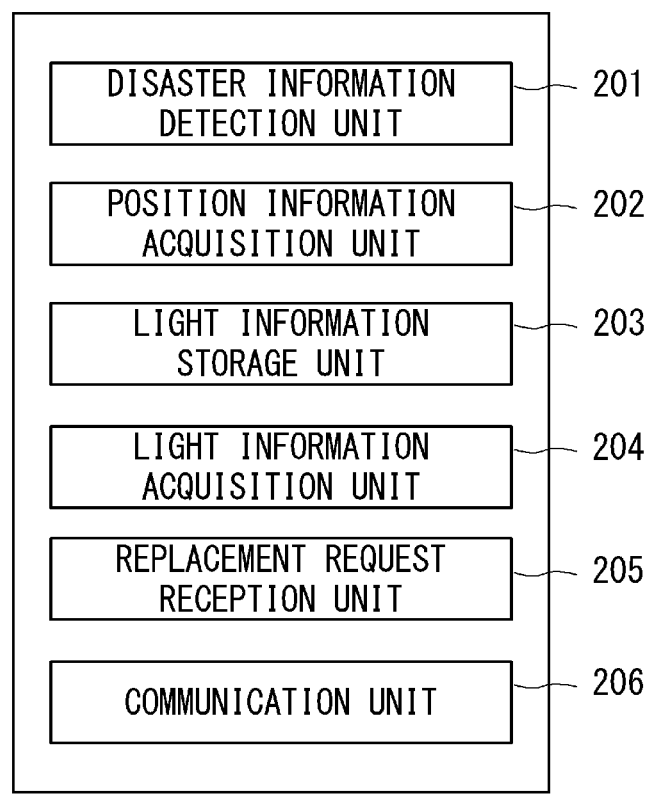
FIG. 2 is a block diagram showing an example of a configuration of a server according to the first embodiment of the present disclosure.

FIG. 2 is a block diagram showing an example of a configuration of the server 200 according to the first embodiment. As shown in FIG. 2, the server 200 includes a disaster information detection unit 201, a position information acquisition unit 202, a light information storage unit 203, a light information acquisition unit 204, a replacement request reception unit 205, and a communication unit 206.

The disaster information detection unit 201 detects disaster information such as an earthquake early warning. Note that the disaster information may be information provided by the Fire and Disaster Management Agency, the National Police Agency, or the local government.

The position information acquisition unit 202 acquires position information of a target point, which is a place where it is necessary to dispose the traffic signal 400. The position information acquisition unit 202 may acquire the position information of the target point from the disaster information detected by the disaster information detection unit 201. Further, the target point is, for example, a pedestrian crossing and an intersection where a traffic signal is dysfunctional due to a power failure or a collapsing of the support pillar of the traffic signal caused by a disaster or some other reason. Further, the target point may be a low-traffic pedestrian crossing or intersection where no traffic signal is usually installed, and where traffic temporarily increases due to the holding of events or the like.

Further, the position information of the target point includes disposition position information indicating the position where the traffic signal 400 is disposed in the target point.

The light information storage unit 203 stores, for each position information of the target point, light information regarding a timing at which lighting of the traffic signal 400 held by the drone 300 are switched among red, yellow, and green. The light information includes lighting patterns. The lighting patterns are determined in advance based on, for example, a volume of traffic at the target point, a size of the target point, and time required for pedestrians to cross a road. Further, when the target point is an intersection including a main road where traffic is heavy and a side road where traffic is relatively low, the lighting patterns for the main road and the lighting patterns for the side road may be determined separately from each other. Further, the light pattern of one target point may be determined based on the relation between it and the light pattern of another target point adjacent to the one target point.

The light information also includes the minimum number of traffic signals 400 required for the target point. For example, when the target point is a pedestrian crossing, and a road where the pedestrian crossing is located has opposing lanes, the minimum number of traffic signals 400 required for the target point is two. Further, for example, when the target point is an intersection where two roads intersect and each of the two roads respectively have opposing lanes, the minimum number of traffic signals 400 required for the target point is four. As described above, the minimum number of traffic signals 400 required for the target point varies depending on, for example, the number of roads at the target point and whether the road has opposing lanes.

The light information acquisition unit 204 performs searches in the light information storage unit 203 based on the position information of the target point acquired by the position information acquisition unit 202, and acquires light information corresponding to this position information from the light information storage unit 203. Note that the light information may be provided by the National Police Agency. In this case, the light information storage unit 203 may not be provided in the server 200.

Then, the communication unit 206 associates the position information of the target point acquired by the position information acquisition unit 202 with the light information acquired by the light information acquisition unit 204 and transmits it to the multiple drones 300. Note that the number of drones 300 to which the communication unit 206 transmits position information of the target point and light information is equal to the minimum number of signals 400 required for the target point included in the light information. Then, the multiple drones 300, which have received the position information of the same target point from the communication unit 206, fly to the target point while forming a formation, hover at the target point, and perform control of the lighting of the held traffic signal 400 based on the light information.

Further, when a power storage amount of a storage battery 304 (described later) of the drone 300 which is hovering at the target point and controlling the lighting of the traffic signal 400 has become less than or equal to a first predetermined value, the drone 300 transmits a replacement request to the server 200. Note that the first predetermined value is a value of the power storage amount that the drone 300 can return from the target point to the drone base. Further, the replacement request includes the position information and the light information of the target point. When the server 200 receives the replacement request, the replacement request reception unit 205 causes the communication unit 206 to transmit the position information of the target point and the light information to multiple replacement drones 300. Note that the "replacement drone 300" is a charged drone 300 which is standing by at the drone base and the power storage amount of its storage battery 304 is higher than a second predetermined value. In the following description, the "replacement drone" will be referred to as a "backup drone". Further, the second predetermined value is a value of the power storage amount that the drone 300 can fly from a drone base to the target point, control the lighting of the traffic signal 400 while hovering at the target point for a predetermined period of time, and return to the drone base. In other words, the second predetermined value is higher than the first predetermined value. Then, the multiple backup drones 300, which have received the position information of the same target point from the communication unit 206, fly to the target point while forming a formation and are replaced by the drones 300 that are already hovering at the target point.

Note that, when the backup drones 300 are replaced by the drones 300 that are already hovering at the target point, the light information may be transmitted from the drones 300 to the backup drones 300.

The communication unit 206 performs communication between the drone 300 and the server 200 via communication means such as the Internet 500.

Figure 3:
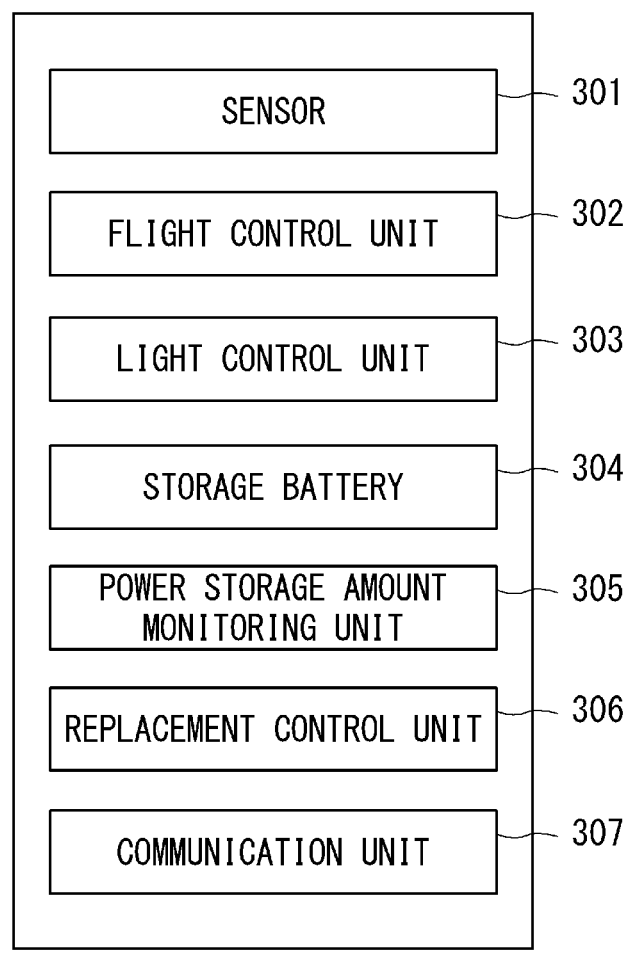
FIG. 3 is a block diagram showing an example of a configuration of a drone according to the first embodiment of the present disclosure.

FIG. 3 is a block diagram showing an example of a configuration of the drone 300 according to the first embodiment. As shown in FIG. 3, the drone 300 includes a sensor 301, a flight control unit 302, a light control unit 303, the storage battery 304, a power storage amount monitoring unit 305, a replacement control unit 306, and a communication unit 307.

The sensor 301 is, for example, an acceleration sensor, an angular velocity sensor, a velocity sensor, an altitude sensor, and an azimuth sensor, and inputs measured acceleration data, angular velocity data, velocity data, altitude data, and azimuth data to the flight control unit 302.

The flight control unit 302 controls, based on the position information of the target point transmitted from the server 200, the flight of the drone 300 holding the traffic signal 400 so that it moves to the target point and hovers at the target point. Specifically, the flight control unit 302 creates an appropriate flight route based on the position information of the target point. Further, the flight control unit 302 controls the flight of the drone 300 so that the drone 300 flies in accordance with the aforementioned flight route based on the acceleration data, angular velocity data, velocity data, altitude data, and azimuth data input from the sensor 301.

Further, the flight control unit 302 controls the flight of the drone 300 so that the drone 300 hovers at a predetermined position of the target point based on the disposition position information included in the position information of the target point.

Further, the flight control unit 302 controls the flight of the drone 300 so that the drone 300 flies to the drone base when a return signal (described later) is input from the replacement control unit 306.

The light control unit 303 controls lighting of the traffic signals 400 so that timings of the lighting of multiple traffic signals 400 respectively held by the multiple drones 300 hovering at the target point are synchronized with each other. Specifically, the light control unit 303 controls the lighting of the traffic signal 400 held by the drone 300 based on the light information transmitted from the server 200. More specifically, for example, the light control unit 303 transmits, to another drone 300 hovering at the target point, information regarding a timing at which lighting of the traffic signal 400 held by the drone 300 including the light control unit 303 mounted thereon are switched among red, yellow and green. Further, the light control unit 303 controls, based on the information regarding the aforementioned timing received from another drone 300 and the light pattern included in the light information, the lighting of the traffic signal 400 held by the drone 300 including the light control unit 303 mounted thereon.

The power storage amount monitoring unit 305 measures the power storage amount of the storage battery 304 and inputs the measured power storage amount to the replacement control unit 306.

When the power storage amount input from the power storage amount monitoring unit 305 has become less than or equal to the first predetermined value while the drone 300 including the replacement control unit 306 mounted thereon is hovering at the target point, the replacement control unit 306 causes the communication unit 307 to transmit a replacement request to the server 200. Further, when the replacement control unit 306 receives an arrival signal indicating that the backup drone 300 has arrived at the target point from the backup drone 300, the replacement control unit 306 inputs a return signal to the flight control unit 302 so that the drone 300 flies to the drone base. Note that the position information of the drone base may be stored in advance in the drone 300 or included in the return signal.

Further, when the drone 300 including the replacement control unit 306 mounted thereon arrives at the target point and another drone 300 is already hovering at the target point, the replacement control unit 306 causes the communication unit 307 to transmit an arrival signal to the other drone 300.

The communication unit 307 performs communication between the server 200 and the drone 300 via communication means such as the Internet 500. Further, the communication unit 307 communicates with another drone 300 via short-range radio communication.

Figure 4:
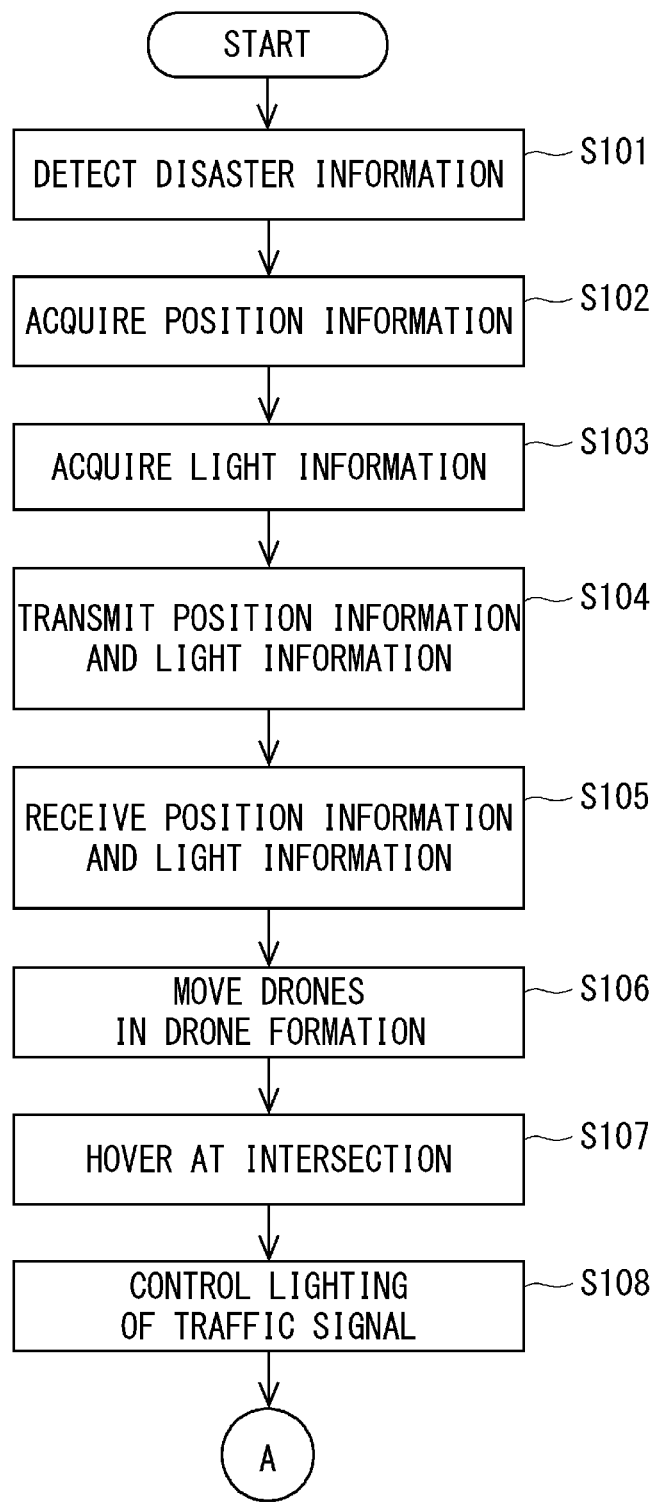
FIG. 4 is a flowchart showing an example of a traffic signal deployment method performed in the traffic signal system according to the first embodiment of the present disclosure.
Figure 5:
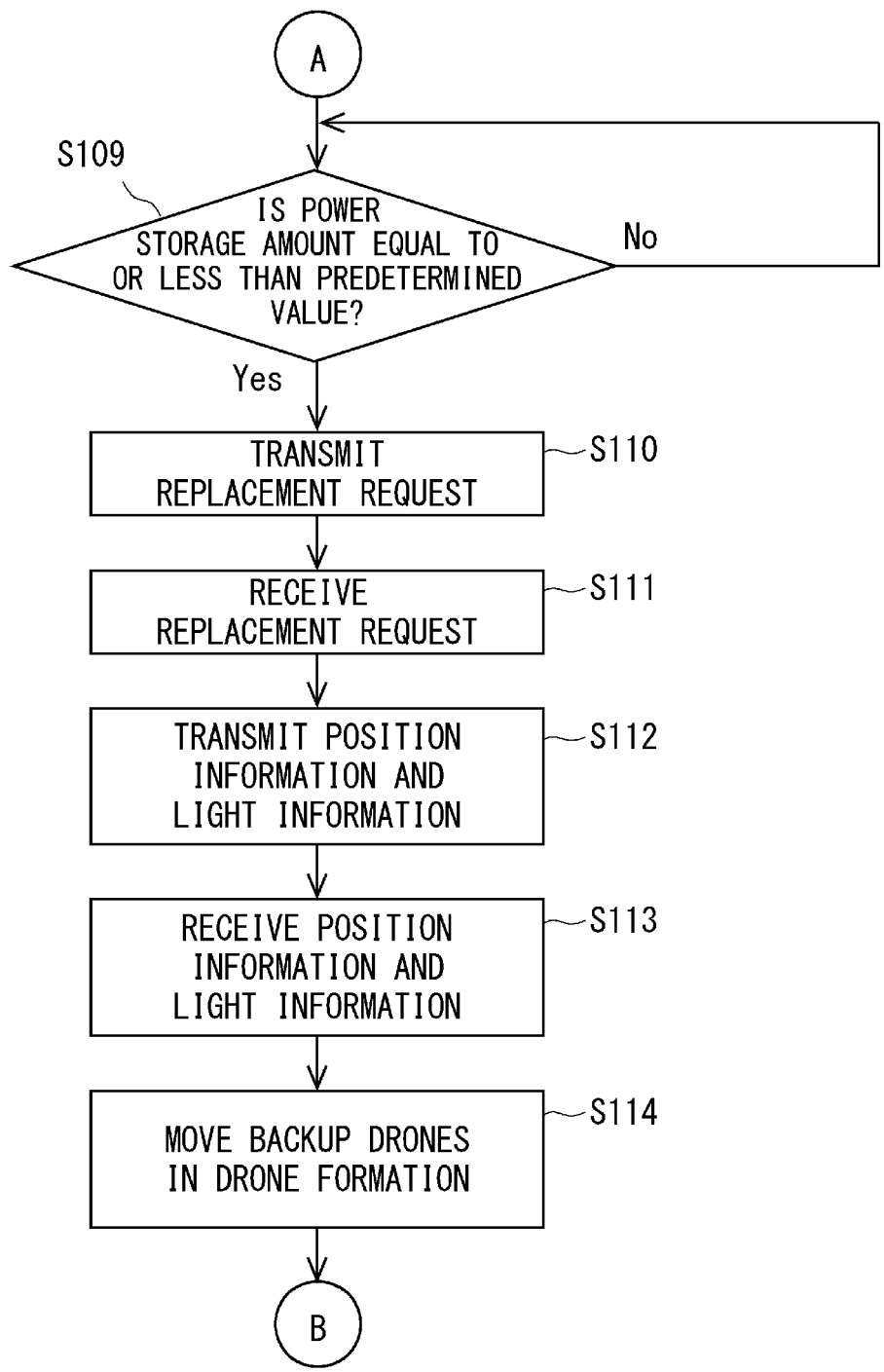
FIG. 5 is a flowchart showing an example of the traffic signal deployment method performed in the traffic signal system according to the first embodiment of the present disclosure.
Figure 6:
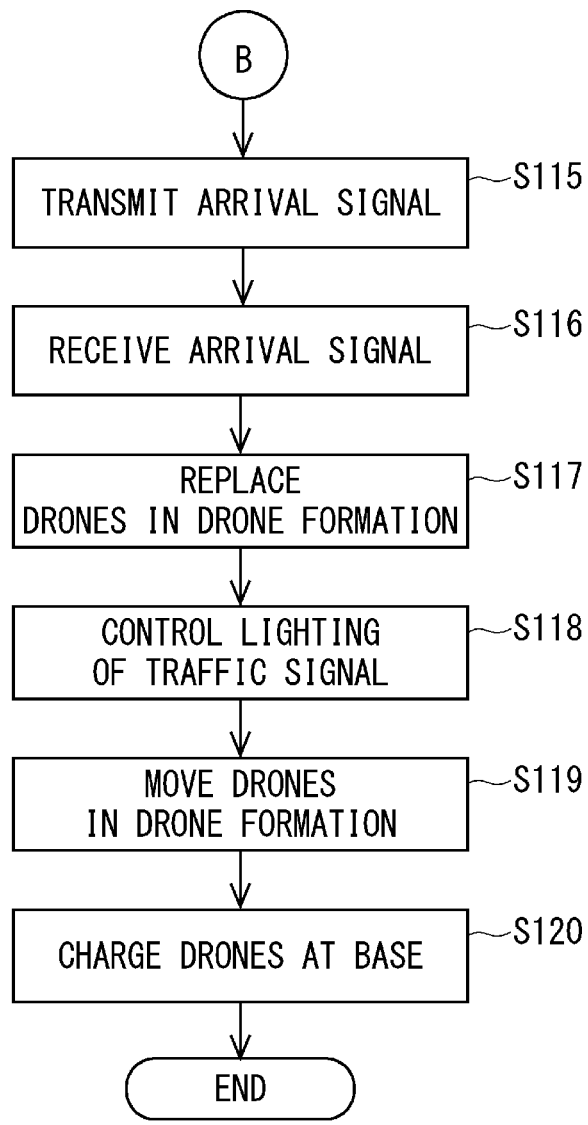
FIG. 6 is a flowchart showing an example of the traffic signal deployment method performed in the traffic signal system according to the first embodiment of the present disclosure.

Next, an example of a traffic signal deployment method performed in the traffic signal system 100 according to the first embodiment will be described with reference to FIGS. 4 to 6.

First, the disaster information detection unit 201 detects disaster information such as an earthquake early warning (Step S101).

Next, the position information acquisition unit 202 acquires position information of a target point, which is a place where it is necessary to dispose the traffic signals 400 is required (Step S102).

Next, the light information acquisition unit 204 performs searches in the light information storage unit 203 based on the position information of the target point acquired in Step S102, and acquires light information corresponding to this position information from the light information storage unit 203 (Step S103).

Next, the communication unit 206 associates the position information of the target point acquired in Step S102 with the light information acquired in Step S103 and transmits it to multiple drones 300 (Step S104).

Next, the multiple charged drones 300 standing by at the drone base receive the position information of the target point and the light information transmitted in Step S104 (Step S105).

Next, in Step S105, the multiple drones 300 that have received the position information of the same target point from the communication unit 206 respectively hold the traffic signals 400, and move to the target point while forming a formation (Step S106). The respective flights of the multiple drones 300 are controlled by the respective flight control units 302 respectively mounted on the multiple drones 300.

Next, when the multiple drones 300 arrive at the target point, for example, an intersection, they hover at the intersection (Step S107). The hovering of each of the multiple drones 300 is controlled by the flight control unit 302. Further, when the drone 300 has the traffic signal 400 in built-in manner so that it can be taken in and out, the drone 300 takes out the traffic signal 400 built therein so that it can be visually recognized.

Next, the light control unit 303 controls lighting of the traffic signal 400 so that timings of the lighting of multiple traffic signals 400 respectively held by the multiple drones 300 hovering at the target point are synchronized with each other (Step S108).

Next, the replacement control unit 306 determines whether or not the power storage amount input from the power storage amount monitoring unit 305 has become less than or equal to a first predetermined value (Step S109).

If the power storage amount input from the power storage amount monitoring unit 305 is higher than the first predetermined value in Step S109 (Step S109; No), the process of Step S109 is repeated.

If the power storage amount input from the power storage amount monitoring unit 305 is equal to or less than the first predetermined value in Step S109 (Step S109; Yes), the replacement control unit 306 causes the communication unit 307 to transmit a replacement request to the server 200 (Step S110).

Next, when the server 200 receives the replacement request (Step S111), the replacement request reception unit 205 causes the communication unit 206 to transmit the position information of the target point and the light information to multiple backup drones 300 (Step S112).

Next, the multiple backup drones 300 receive the position information of the target point and the light information transmitted in Step S112 (Step S113).

Next, in Step S113, the multiple backup drones 300 that have received the position information of the same target point from the communication unit 206 respectively hold the traffic signals 400, and move to the target point while forming a formation (Step S114).

Next, when the multiple backup drones 300 arrive at the target point, the replacement control unit 306 causes the communication unit 307 to transmit arrival signals to other multiple drones 300 that are already hovering at the target point (Step S115).

Next, when other multiple drones 300 that are already hovering at the target point receive the arrival signals (Step S116), the other multiple drones 300 are replaced by the multiple backup drones 300 forming a formation (Step S117). Specifically, the replacement control units 306 of other multiple drones 300 that are already hovering at the target point respectively input return signals to the corresponding flight control units 302. Then, other multiple drones 300 leave the target point, and the multiple backup drones 300 start hovering at the target point.

Next, the light control unit 303 of the backup drone 300 controls the lighting of the traffic signal 400 so that the timings of the lighting of the multiple traffic signals 400 respectively held by the multiple backup drones 300 hovering at the target point are synchronized with each other (Step S118). Subsequent processes of the backup drone 300 are performed in a manner similar to that by which processes of Steps S109 to S120 are performed.

Further, in Step S117, the multiple drones 300 that have left the target point move to the drone base while forming a formation in order to return to the drone base (Step S119). Specifically, the flight control unit 302, which has received the return signal from the replacement control unit 306, controls the flight of the drone 300 that has left the target point so that it returns to the drone base.

Next, when the multiple drones 300 arrive at the drone base, the storage batteries 304 of the multiple drones 300 are charged (Step S120).

By use of the traffic signal system 100 and the traffic signal deployment method according to the first embodiment described above, it is possible to move, by multiple drones 300, multiple traffic signals 400 to a target point where it is necessary to dispose of the traffic signals 400 and dispose them in the target point, and to control timings of the lighting of the multiple traffic signals 400 disposed. Therefore, it is possible to provide the traffic signal system 100 and the traffic signal deployment method that enable the traffic signal 400 to be disposed quickly.

Further, when the charge amount of the storage battery 304 has become less than or equal to the first predetermined value while the drone 300 is hovering at the target point, the drone 300 is replaced by the backup drone 300. Therefore, regardless of the total power storage amount in the storage battery 304, it is possible to dispose the traffic signals 400 without interruption in a place where it is necessary to dispose the traffic signals 400.

Further, the traffic signal 400 is formed by an organic EL sheet, whereby the traffic signal 400 is light and thin. As a result, the traffic signal 400 can be easily held by the drone 300 and the power consumption can be reduced.

Figure 7:
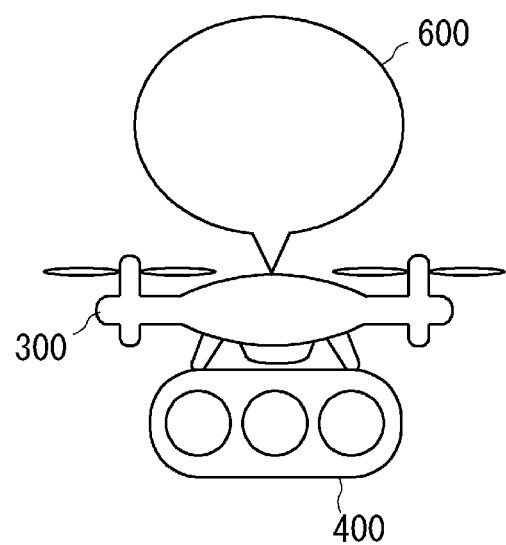
FIG. 7 is a diagram showing another example of the drone in the traffic signal system according to the first embodiment of the present disclosure.

FIG. 7 shows another example of the drone 300 in the traffic signal system 100. As shown in FIG. 7, a balloon 600 filled with helium gas may be attached to the drone 300. This structure reinforces lift of the drone 300.

Figure 8:
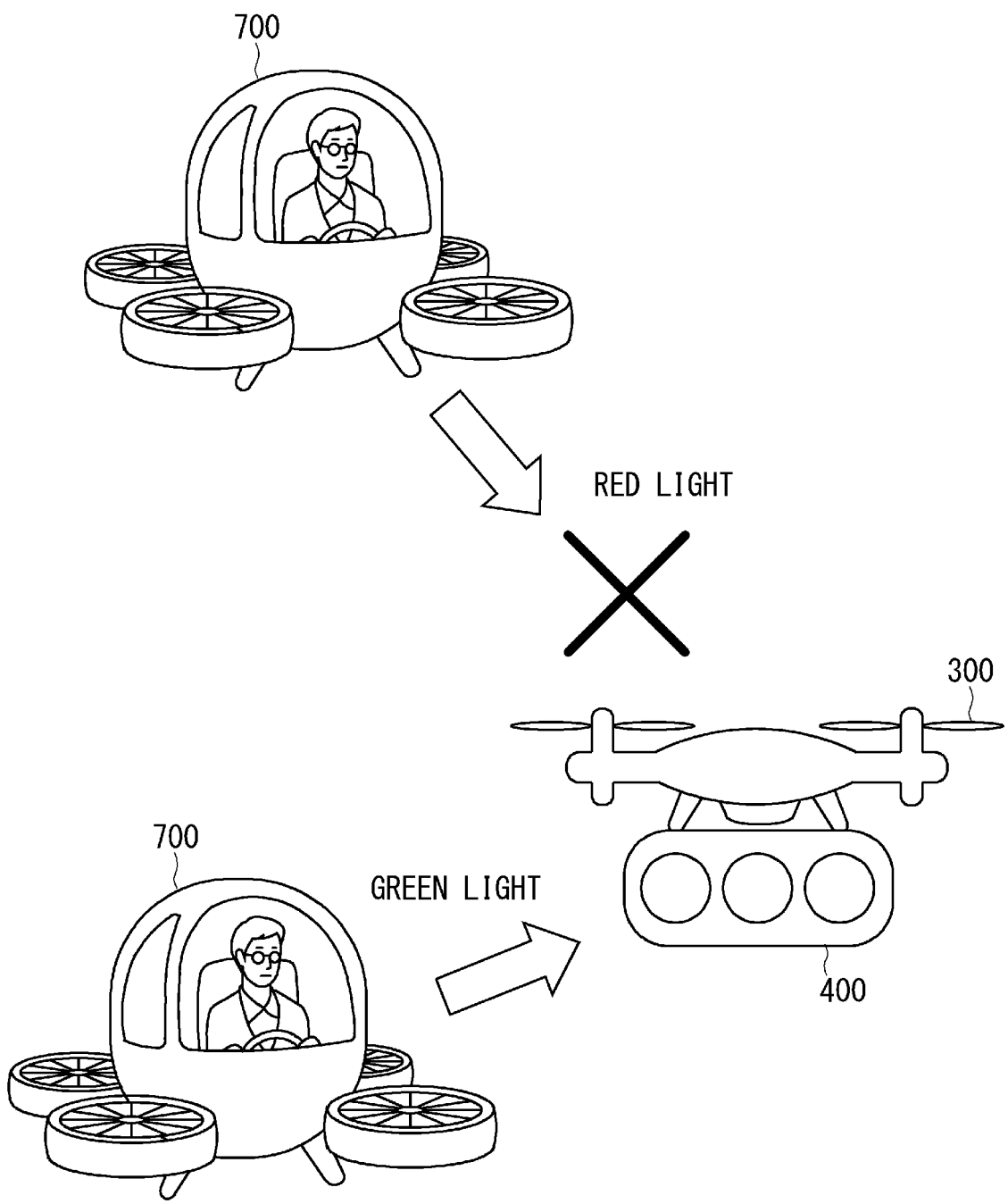
FIG. 8 is a diagram showing another example of the traffic signal system according to the first embodiment of the present disclosure.

FIG. 8 shows another example to which the traffic signal system 100 is applied. In the example shown in FIG. 8, the traffic signal system 100 is applied to air traffic control of a flying vehicle 700. By transmitting position information used by air traffic control as position information of a target point from the server 200 to the drone 300, it is possible to dispose the traffic signal 400 in the air where it is necessary to dispose the traffic signal. By means of the above, when the flying vehicle 700 becomes available for practical application in the future, it will be possible to address a problematic situation where a large number of flying vehicles 700 are flying and hence air traffic control becomes difficult.

Further, position information of an overcrowded position in the air may be calculated as position information of the target point based on GPS information of each flying vehicle 700. By the above, it is possible to dispose the traffic signals 400 in an overcrowded area in the air, and thus it is possible to address the problem of the increase in the number of the flying vehicles 700 in the air.

Note that the present disclosure is not limited to the above-described embodiment and may be changed as appropriate without departing from the scope of the present disclosure. For example, the present disclosure can be implemented by causing a Central Processing Unit (CPU) to execute a computer program to perform the processing steps shown in the flowchart of FIGS. 4 to 6.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A traffic signal system comprising multiple drones each configured to be able to hold a traffic signal, and a server configured to be able to communicate with the multiple drones, wherein
the server comprises a position information acquisition unit configured to acquire position information of a target point, the target point being a place where it is necessary to dispose the traffic signal, and
the drone comprises:
a flight control unit configured to control flight of the drone holding the traffic signal so that it moves to the target point and hovers at the target point based on the position information; and
a light control unit configured to control lighting of the traffic signal so that timings of the lighting of multiple the traffic signals respectively held by the multiple drones hovering at the target point are synchronized with each other.

2. The traffic signal system according to claim 1, wherein the drone comprises a storage battery, and
when a charge amount of the storage battery has become less than or equal to a first predetermined value while the drone is hovering at the target point, the drone is replaced by another drone in which a charge amount of the storage battery is higher than a second predetermined value, the second predetermined value being higher than the first predetermined value.

3. The traffic signal system according to claim 1, wherein the traffic signal is formed by an organic electro-luminescence (EL) sheet.

4. The traffic signal system according to claim 1, wherein a balloon filled with helium gas is attached to the drone.

5. The traffic signal system according to claim 1, wherein the position information acquisition unit acquires position information used in air traffic control as the position information of the target point.

6. A traffic signal deployment method, wherein:
a server acquires position information of a target point, the target point being a place where it is necessary to dispose a traffic signal;
a drone holding the traffic signal moves to the target point and hovers at the target point based on the position information; and
the drone holding the traffic signal controls lighting of the traffic signal so that timings of the lighting of the multiple traffic signals respectively held by the multiple drones hovering at the target point are synchronized with each other.

7. The traffic signal deployment method according to claim 6, wherein
the drone comprises a storage battery, and
when a charge amount of the storage battery has become less than or equal to a first predetermined value while the drone is hovering at the target point, the drone is replaced by another drone in which a charge amount of the storage battery is higher than a second predetermined value, the second predetermined value being higher than the first predetermined value.

* * * * *